(12) United States Patent
Funatsu

(10) Patent No.: US 11,843,850 B2
(45) Date of Patent: Dec. 12, 2023

(54) APPARATUS, METHOD FOR APPARATUS, AND STORAGE MEDIUM

(71) Applicant: CANON KABUSHIKI KAISHA, Tokyo (JP)

(72) Inventor: Yoshihiro Funatsu, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/836,901

(22) Filed: Jun. 9, 2022

(65) Prior Publication Data

US 2022/0400201 A1   Dec. 15, 2022

(30) Foreign Application Priority Data

Jun. 14, 2021   (JP) ................................ 2021-098472

(51) Int. Cl.
*H04N 23/611*   (2023.01)
*H04N 23/667*   (2023.01)

(52) U.S. Cl.
CPC ......... *H04N 23/611* (2023.01); *H04N 23/667* (2023.01)

(58) Field of Classification Search
CPC .......................... H04N 23/611; H04N 23/667
See application file for complete search history.

(56) References Cited

U.S. PATENT DOCUMENTS

| 2009/0066807 A1* | 3/2009 | Miyanishi | .............. | H04N 23/62 |
| | | | | 348/231.2 |
| 2022/0060619 A1* | 2/2022 | Pinhasov | ............... | H04N 23/66 |

FOREIGN PATENT DOCUMENTS

JP   2009071433 A   4/2009

* cited by examiner

*Primary Examiner* — Yogesh K Aggarwal
(74) *Attorney, Agent, or Firm* — CANON U.S.A., INC. IP Division

(57) ABSTRACT

A method for an apparatus includes setting, as a first setting, a first item relating to a type of a detection target, setting, as a second setting, a second item relating to an AF area, executing object detection processing on an object of the type set in the first setting, executing focus detection processing based on information about the AF area set in the second setting, and storing the settings as a combination of the set first item and the set second item, wherein the stored settings are called by a user through a specific operation, and the object detection processing and the focus detection processing are executed based on the called settings.

20 Claims, 13 Drawing Sheets

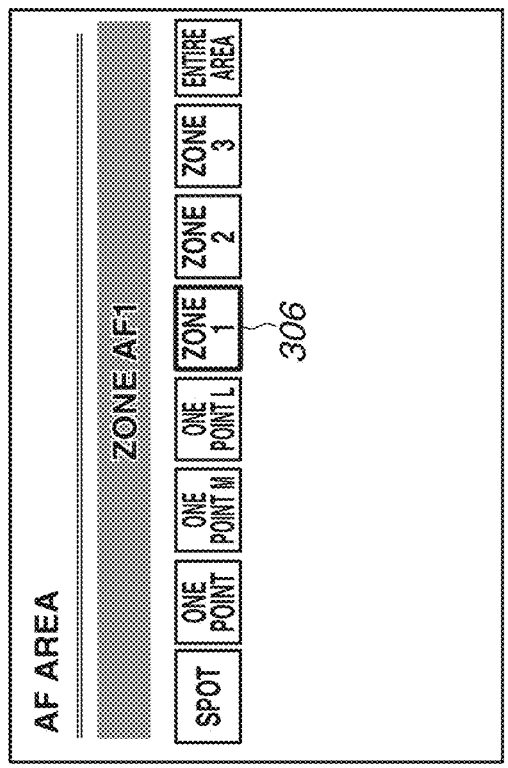
FIG.3A
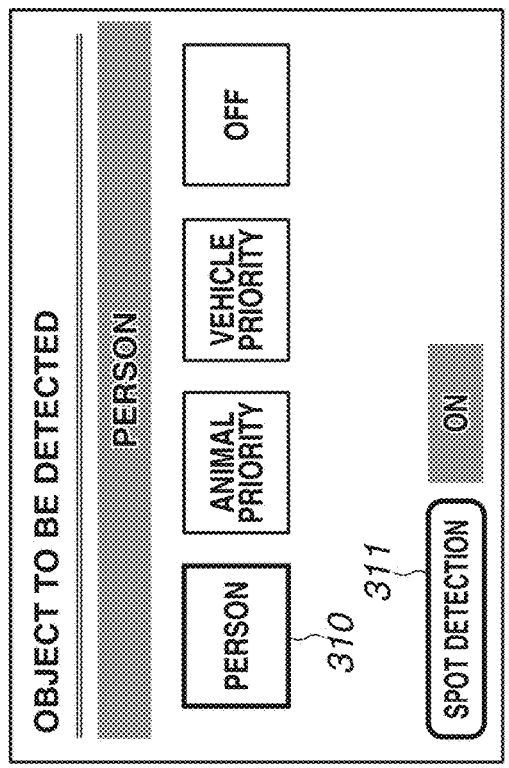
FIG.3B
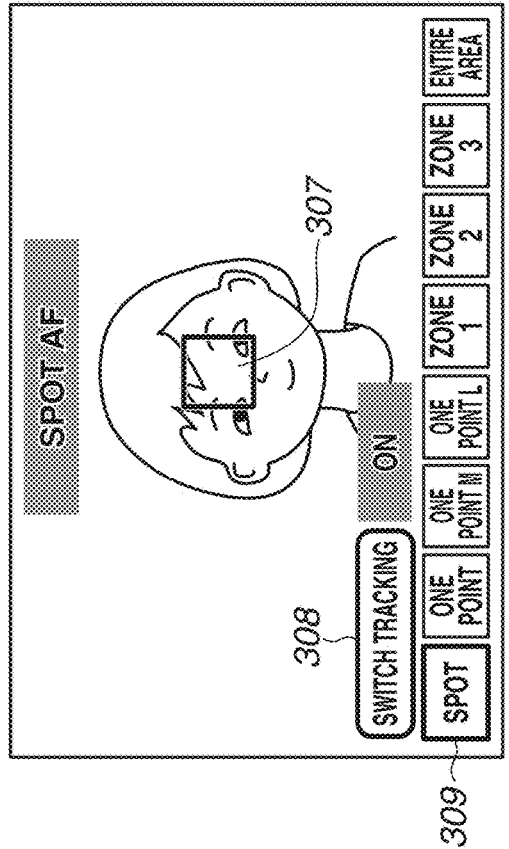
FIG.3C
FIG.3D

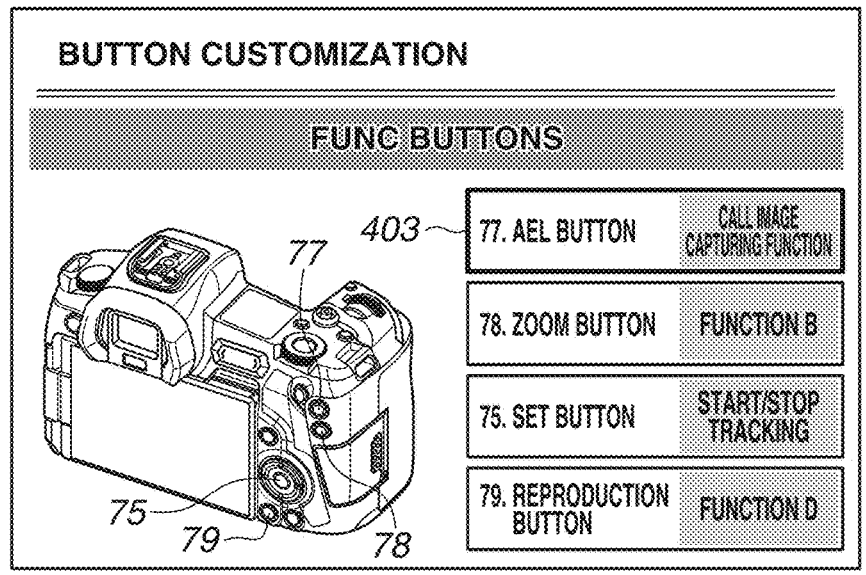
FIG.4C
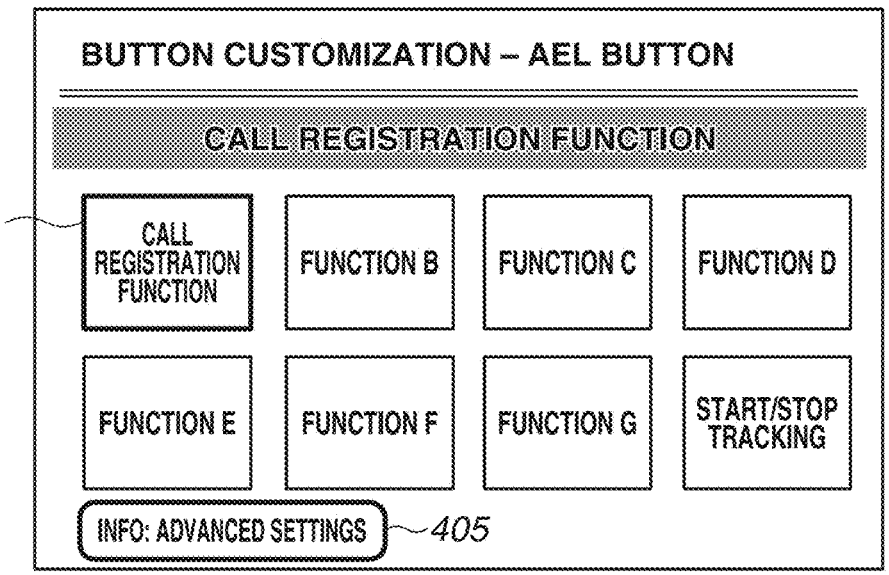
FIG.4D
FIG.4E
| | | |
|---|---|---|
| ☑ | AF OPERATION | ONE SHOT / SERVO |
| ☑ | AF AREA | ONE POINT / ZONE / ENTIRE AREA ... |
| ☑ | CALL POSITION | CURRENT POSITION / HP |
| ☐ | TRACKING | ON / OFF |
| ☑ | OBJECT TO BE DETECTED | PERSON / ANIMAL / VEHICLE / OFF |
| ☐ | SPOT DETECTION | ON / OFF |
| ☑ | PUPIL DETECTION | ON / OFF |

| | AF AREA | | | | | | | |
|---|---|---|---|---|---|---|---|---|
| 506 | SPOT | ONE POINT | ONE POINT M | ONE POINT L | ZONE 1 | ZONE 2 | ZONE 3 | ENTIRE AREA |
| TRACKING SETTING — OFF | ▣ | □ | ⌖ | ⌗ | ⌊₁ | ⌊₂ | ⌊₃ | ⌊ ⌋ |
| TRACKING SETTING — ON | ▣● | □● | ⌖● | ⌗● | ⌊₁● | ⌊₂● | ⌊₃● | ⌊●⌋ |

| 507 | ONE SHOT | SERVO |
|---|---|---|
| AF OPERATION | ONE SHOT | SERVO |

| 508 | PERSON | ANIMAL | VEHICLE | OFF |
|---|---|---|---|---|
| OBJECT TO BE DETECTED | 👤 | 🐾 | 🚗 | OFF |

| 509 | ON | OFF |
|---|---|---|
| PUPIL DETECTION | 👁ON | 👁OFF |

| 510 | ON | OFF |
|---|---|---|
| TRACKING STATE | ⌐¬ ON | ⌐¬ OFF |

FIG.6

| | BEFORE AF IS ACTIVATED (SW0) | AFTER AF IS ACTIVATED (SW1/SW2) |
|---|---|---|
| SPOT/ONE POINT/ZOOM AREA | 601 | 602 |
| ZONE/ENTIRE AREA | 603 | 604 |
| DETECTION FRAME | 605 | 606 |
| TRACKING FRAME (TRACKING) | 607 | 608 |
| HP FRAME | 609 | 610 |

FIG.7

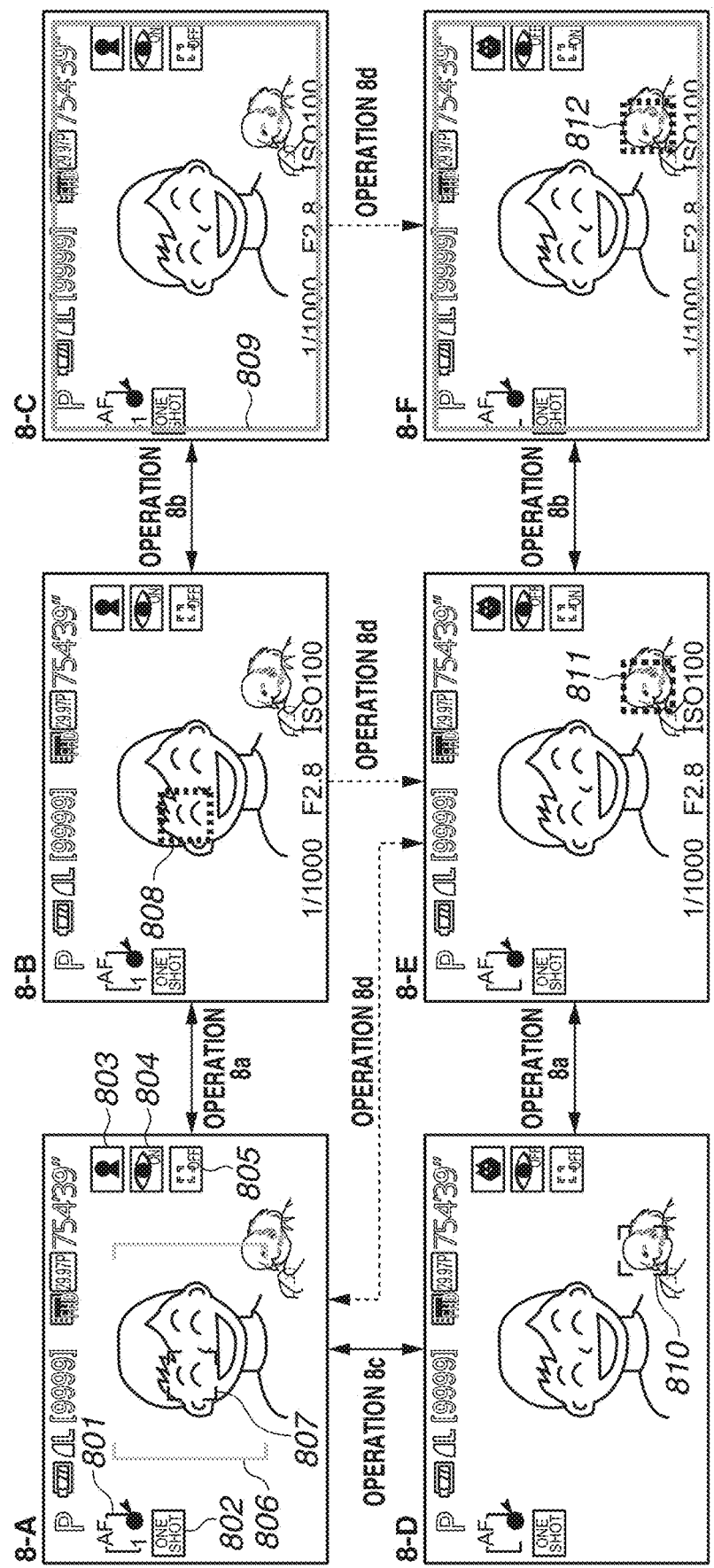

FIG. 8B

OPERATION 8c

| | CALL REGISTRATION FUNCTION > ADVANCED SETTINGS | | |
|---|---|---|---|
| ☑ | AF OPERATION | ONE SHOT /SERVO | |
| ☑ | AF AREA | ONE POINT / ZONE /ENTIRE AREA... | |
| ☐ | CALL POSITION | CURRENT POSITION / HP | |
| ☐ | TRACKING | ON/ OFF | |
| ☑ | OBJECT TO BE DETECTED | PERSON /ANIMAL/ VEHICLE / OFF | |
| ☐ | SPOT DETECTION | ON / OFF | |
| ☑ | PUPIL DETECTION | ON/ OFF | |
| ☐ | AF START | ON/ OFF | |

OPERATION 8d

| | CALL REGISTRATION FUNCTION > ADVANCED SETTINGS | | |
|---|---|---|---|
| ☑ | AF OPERATION | ONE SHOT /SERVO | |
| ☑ | AF AREA | ONE POINT / ZONE /ENTIRE AREA... | |
| ☐ | CALL POSITION | CURRENT POSITION / HP | |
| ☐ | TRACKING | ON/ OFF | |
| ☑ | OBJECT TO BE DETECTED | PERSON /ANIMAL/ VEHICLE / OFF | |
| ☐ | SPOT DETECTION | ON / OFF | |
| ☑ | PUPIL DETECTION | ON/ OFF | |
| ☑ | AF START | ON/ OFF | |

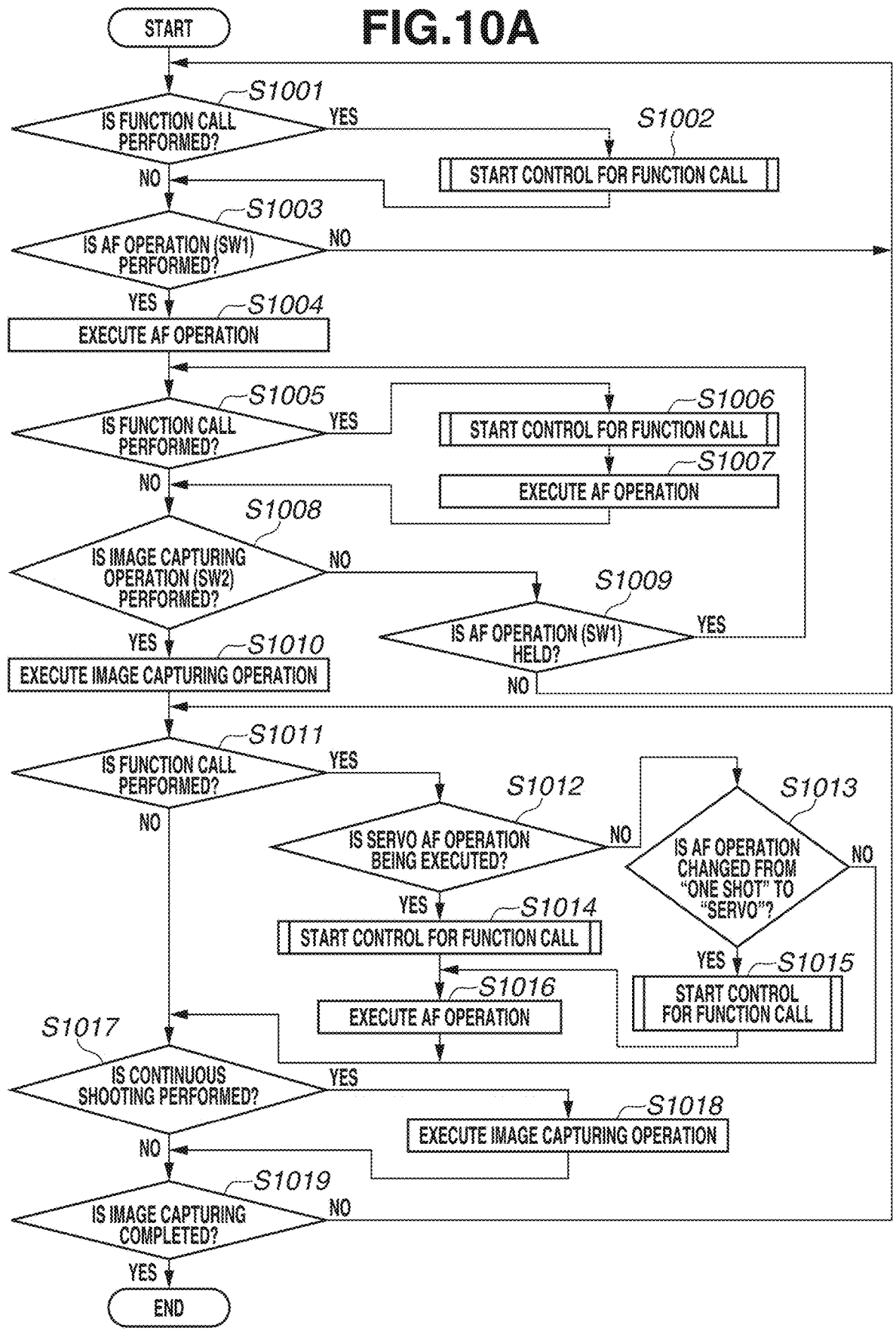

APPARATUS, METHOD FOR APPARATUS, AND STORAGE MEDIUM

BACKGROUND

Technical Field

The aspect of the embodiments relates to an apparatus, a method for the apparatus, and a storage medium.

Description of the Related Art

With the recent improvements in auto exposure performance, autofocus (AF) performance, and object detection performance of image capturing apparatuses, almost any type of image capturing can be performed in an automatic mode. However, in some image capturing scenes, it may be desirable to individually set image capturing conditions. In this case, it may be desirable to immediately change settings.

Japanese Patent Application Laid-Open No. 2009-71433 discusses an image capturing apparatus that includes a setting unit configured to set a plurality of setting items, a designation unit configured to designate a registration target item to be registered from among the plurality of setting items, and a registration control unit configured to resister registered image capturing conditions. The image capturing apparatus has such a feature that the registered image capturing conditions are called according to a call operation by a user and new image capturing conditions in which the registered image capturing conditions are reflected are generated.

This enables the user to preliminarily register image capturing settings and call the settings, thereby making it possible to immediately change the settings.

However, the method discussed in Japanese Patent Application Laid-Open No. 2009-71433 fails to describe a technique for registering settings for object detection, and also fails to describe a method for fully utilizing the advancements in the detection performance.

Many of the related-art image capturing apparatuses register only settings for exposure and AF in the operation of calling image capturing functions, and do not take into consideration the conditions for object detection.

SUMMARY

According to an aspect of the embodiments, a method for an apparatus includes setting, as a first setting, a first item relating to a type of a detection target, setting, as a second setting, a second item relating to an AF area, executing object detection processing on an object of the type set in the first setting, executing focus detection processing based on information about the AF area set in the second setting, and storing the settings as a combination of the set first item and the set second item, wherein the stored settings are called by a user through a specific operation, and the object detection processing and the focus detection processing are executed based on the called settings.

Further features of the disclosure will become apparent from the following description of exemplary embodiments with reference to the attached drawings.

BRIEF DESCRIPTION OF THE DRAWINGS

FIGS. 3A to 3D each illustrate a menu for changing setting values.

FIGS. 4A to 4E each illustrate a menu for setting a button customization function for tracking activation and function call.

FIG. 6 illustrates a display of each frame before and after autofocus (AF) (operation) is activated.

FIG. 7 illustrates a display of frames as a combination of an AF area and a tracking setting.

FIGS. 8A and 8B each illustrate an operation and transition of a screen for a function call.

FIG. 10A is a flowchart illustrating a control operation for a function call using a combination of an object detection type and an AF area.

DESCRIPTION OF THE EMBODIMENTS

The disclosure will now be described in detail below with reference to the accompanying drawings showing embodiments thereof. Configurations described in the following exemplary embodiments are merely examples, and the scope of the disclosure is not limited by the configurations described in the exemplary embodiments.

Configuration of Digital Camera

Figure 1A:
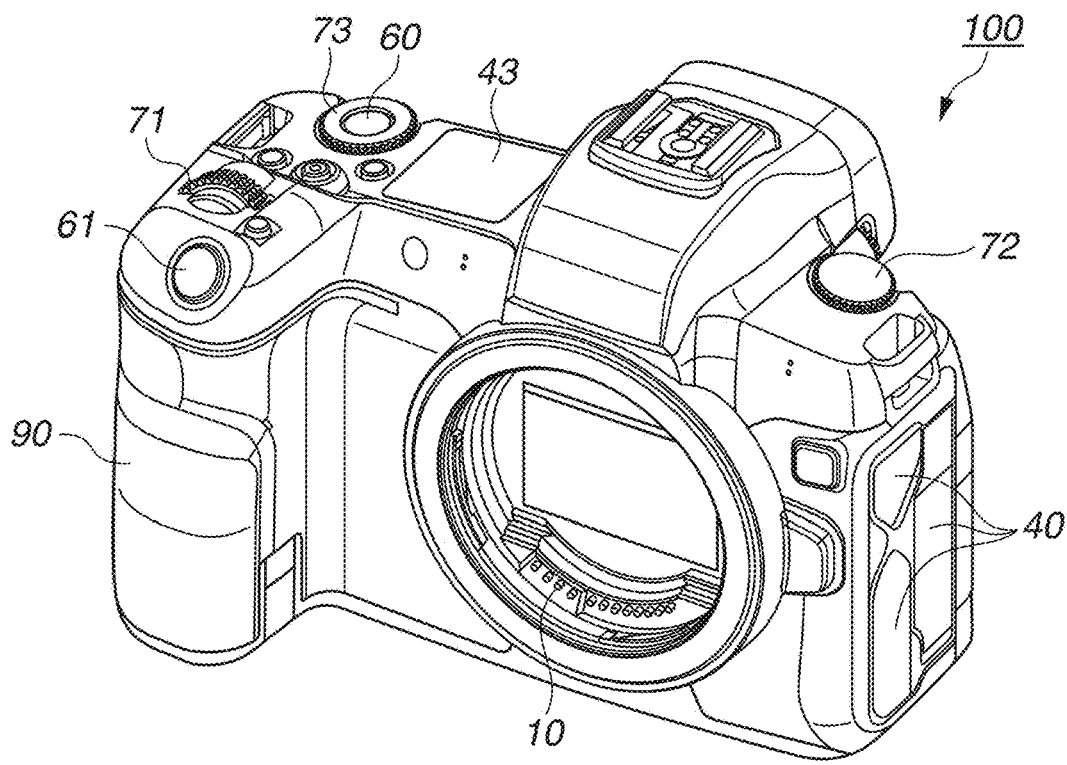
FIGS. 1A and 1B are external views of a digital camera according to an exemplary embodiment.
Figure 1B:
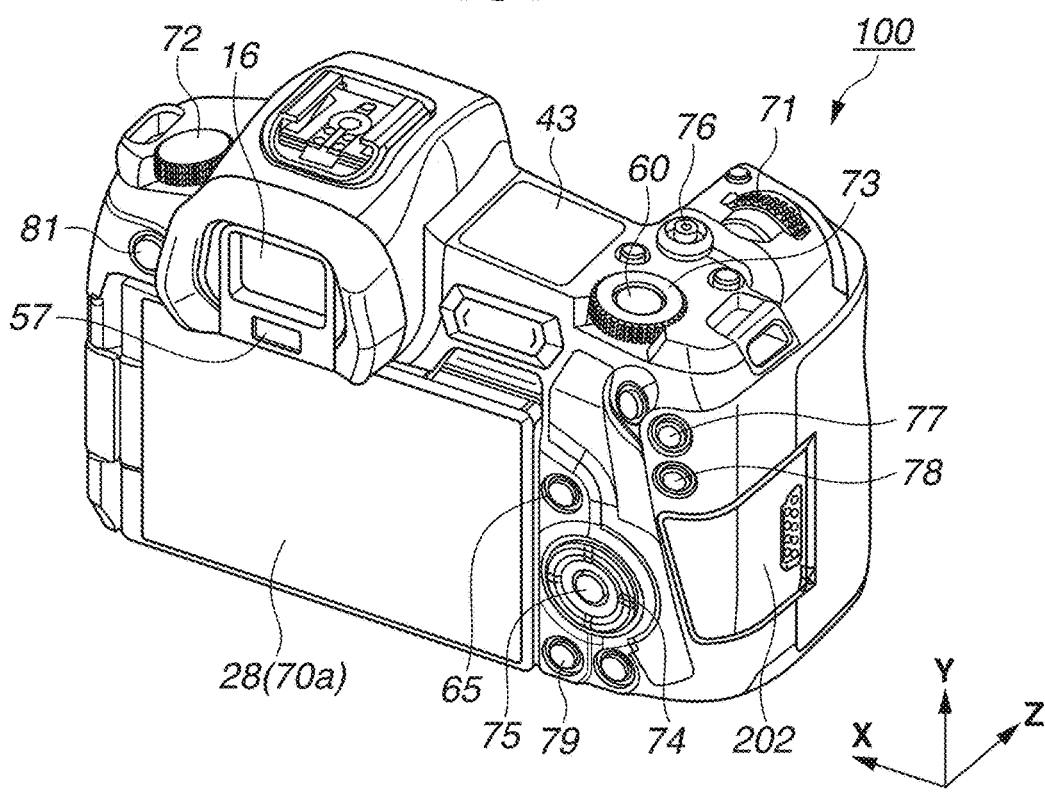

FIGS. 1A and 1B are external views of a digital camera 100 as an example of an apparatus (electronic apparatus) according to an exemplary embodiment of the disclosure. FIG. 1A is a front perspective view of the digital camera 100, and FIG. 1B is a rear perspective view of the digital camera 100. As illustrated in FIG. 1B, a display unit 28 is provided on the back side of the digital camera 100 and displays images and various information. A touch panel 70a is configured to detect a touch operation on a display surface (operation surface) of the display unit 28. An outer finder display unit 43 is provided on the top surface of the digital camera 100, and displays various setting values of the digital camera 100, including a shutter speed and an aperture. A shutter button 61 is an operation unit for issuing an image capturing instruction. A mode selection switch 60 is an operation unit for changing various modes. A terminal cover 40 is a cover for protecting a connector (not illustrated) that connects the digital camera 100 to a connection cable with an external apparatus.

A main electronic dial 71 is a rotational operation member. For example, setting values, such as the shutter speed and the aperture, can be changed by turning the main electronic dial 71. A power switch 72 is an operation member to switch on and off the power supply of the digital camera 100. A sub-electronic dial 73 is a rotational operation member. For example, movement of a selection frame and image feeding can be performed by turning the sub-electronic dial 73. A cross key 74 is a cross-key operation member (four-direction key) including buttons corresponding to an upper part, a lower part, a left part, and a right part of the cross key 74, respectively, that can be pressed in the four directions, respectively, and processing corresponding to the pressed part of the cross key 74 can be performed. A SET button 75 is a push button and is mainly used, for example, to determine a selection item. A video button 76 is used to instruct to start or stop capturing (recording) a moving image.

By pressing an auto exposure (AE) lock button 77 in an image capturing standby state, an exposure state can be fixed. A zoom button 78 is an operation button to switch on and off a zoom mode in a live view (LV) display of an image capturing mode. By operating the main electronic dial 71 after the zoom mode is turned on, an LV image can be enlarged or reduced. In a reproduction mode, the zoom button 78 functions as an operation button to enlarge a reproduced image or to increase the magnification ratio thereof. A reproduction button 79 is an operation button to switch between the image capturing mode and the reproduction mode. When the reproduction button 79 is pressed in the image capturing mode, the mode transitions to the reproduction mode, so that the latest image out of the images recorded on a recording medium 200 can be displayed on the display unit 28. When a menu button 81 is pressed, a menu screen on which various settings can be made is displayed on the display unit 28. A user can intuitively perform various settings using the menu screen displayed on the display unit 28, the cross key 74, the SET button 75, or a multi-controller (MC) 65. The MC 65 is configured to issue an orientation instruction in eight directions and to receive a press operation at a central portion of the MC 65.

A communication terminal 10 is a communication terminal for the digital camera 100 to communicate with a (detachable) lens unit 150 to be described below. An eyepiece 16 is an eyepiece of an eyepiece finder (peep-type finder), and the user can view a video image displayed on an internal electronic view finder (EVF) 29 through the eyepiece 16. An eye approach detection unit 57 is an eye proximity detection sensor that detects whether an eye of the user is in proximity to the eyepiece 16. A cover 202 is a cover of a slot to store the recording medium 200.

A grip portion 90 is a holding portion having such a shape that the user can easily hold the digital camera 100 with his or her right hand. When the user holds the digital camera 100 by gripping the grip portion 90 with the little finger, ring finger, and middle finger of his or her right hand, the shutter button 61 and the main electronic dial 71 are disposed in positions where the user can operate the digital camera 100 with the index finger of his or her right hand. In this state, the sub-electronic dial 73 is disposed in a position where the user can operate the digital camera 100 with the thumb of his or her right hand.

Figure 2:
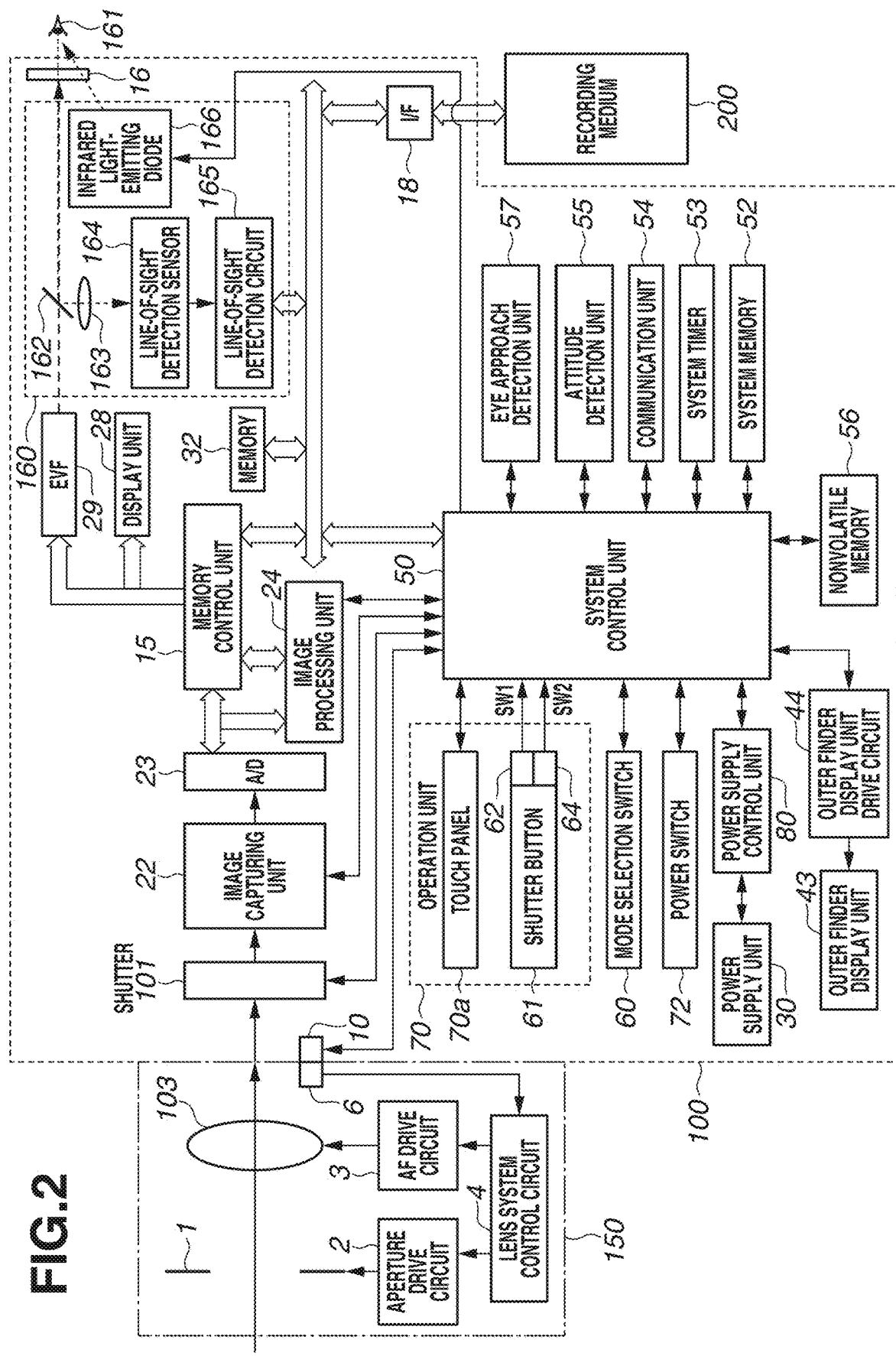
FIG. 2 is a block diagram illustrating a configuration example of the digital camera.

FIG. 2 is a block diagram illustrating a configuration example of the digital camera 100 according to the present exemplary embodiment. As illustrated in FIG. 2, the lens unit 150 is a lens unit equipped with a replaceable image capturing lens. A lens 103 is generally composed of a plurality of lenses, but is illustrated as a single lens in FIG. 2 for simplification. A communication terminal 6 is a communication terminal for the lens unit 150 to communicate with the digital camera 100. The lens unit 150 communicates with a system control unit 50 via the communication terminal 6 and the communication terminal 10, and controls an aperture 1 via an aperture drive circuit 2 by using an internal lens system control circuit 4. Then, the lens unit 150 performs focusing by displacing the lens 103 via an AF drive circuit 3.

A shutter 101 is a focal plane shutter for freely controlling an exposure time of an image capturing unit 22 under the control of the system control unit 50.

The image capturing unit 22 is an image sensor that converts an optical image into an electrical signal, and is composed of a charge-coupled device (CCD), a complementary metal-oxide semiconductor (CMOS) device, or the like. An analog-to-digital (A/D) converter 23 is used to convert an analog signal output from the image capturing unit 22 into a digital signal.

An image processing unit 24 performs predetermined processing, such as pixel interpolation, resizing processing, including reduction, or color conversion processing, on data supplied from the A/D converter 23 or data supplied from a memory control unit 15. The image processing unit 24 also performs predetermined arithmetic processing using the captured image data. The system control unit 50 performs exposure control and focus adjustment control based on the arithmetic processing result obtained by the image processing unit 24. Thus, through-the-lens (TTL) autofocus (AF) processing, AE processing, flash preliminary emission (EF) processing, and the like are performed. The image processing unit 24 further performs predetermined arithmetic processing using the captured image data, and performs TTL auto white balance (AWB) processing based on the obtained arithmetic processing result.

The memory control unit 15 controls data transmission and reception between the A/D converter 23, the image processing unit 24, and a memory 32. Data output from the A/D converter 23 is written into the memory 32 via the image processing unit 24 and the memory control unit 15, or is directly written into the memory 32 via the memory control unit 15 without using the image processing unit 24.

The memory 32 stores the image data that is obtained by the image capturing unit 22 and is converted into the digital data by the A/D converter 23. The memory 32 has a storage capacity that is sufficient to store a predetermined number of still images and a predetermined duration of moving images and sounds. The memory 32 is also used as a memory for image display (video memory). The image data for display that is written into the memory 32 is displayed on the display unit 28 or the EVF 29 via the memory control unit 15. The display unit 28 and the EVF 29 perform display in response to signals from the memory control unit 15 on a display such as a liquid crystal display (LCD) or an organic electroluminescence (EL) display. The data that is subjected to A/D conversion by the A/D converter 23 and stored in the memory 32 is sequentially transferred to and displayed on the display unit 28 or the EVF 29, thereby making it possible to perform LV display. An image displayed on the LV display is referred to as a "LV image".

An infrared light-emitting diode 166 is a light-emitting element to detect the line-of-sight position of the user in a finder screen, and emits infrared light to an eyeball (eye) 161 of the user that is in proximity to the eyepiece 16. The infrared light emitted from the infrared light-emitting diode 166 is reflected by the eyeball (eye) 161, and this infrared reflected light reaches a dichroic mirror 162. The dichroic mirror 162 reflects the infrared light and allows visible light to pass. The infrared reflected light optical path of which has been changed forms an image on an imaging surface of a line-of-sight detection sensor 164 via an image-forming lens 163. The image-forming lens 163 is an optical member that constitutes a line-of-sight detection optical system. The line-of-sight detection sensor 164 is composed of an image capturing device such as a CCD image sensor.

The line-of-sight detection sensor 164 photoelectrically converts the incident infrared reflected light into an electrical signal, and outputs the electrical signal to a line-of-sight detection circuit 165. The line-of-sight detection circuit 165 includes at least one processor. The line-of-sight detection circuit 165 detects the line-of-sight position of the user from an image or motion of the eyeball (eye) 161 of the user based on the output signal from the line-of-sight detection sensor 164, and outputs detected information to the system control unit 50. Thus, the dichroic mirror 162, the image-forming lens 163, the line-of-sight detection sensor 164, the infrared light-emitting diode 166, and the line-of-sight detection circuit 165 constitute a line-of-sight detection block 160.

In the present exemplary embodiment, the line-of-sight detection block 160 is used to detect a line-of-sight based on a method called a cornea reflection method. The cornea reflection method is a method for detecting the orientation and position of a line of sight based on a positional relationship between reflected light, which is infrared light emitted from the infrared light-emitting diode 166 and reflected especially by a cornea of the eye (eyeball) 161, and a pupil of the eye (eyeball) 161. Other various methods for detecting the orientation and position of a line of sight include a sclera reflection method that utilizes a difference in light reflectance between black and white eye regions. Line-of-sight detection methods other than the above-described methods can also be used as long as the orientation and position of a line of sight can be detected.

The outer finder display unit 43 displays various setting values, including the shutter speed and the aperture, for the digital camera 100 via an outer finder display unit drive circuit 44.

A nonvolatile memory 56 is an electrically erasable recordable memory, such as a flash read-only memory (ROM). The nonvolatile memory 56 stores constants, programs, and the like for operations of the system control unit 50. Programs stored in the nonvolatile memory 56 refer to computer programs for executing various flowcharts to be described below according to the present exemplary embodiment.

The system control unit 50 is a control unit including at least one processor or circuit, and controls the overall operation of the digital camera 100. Each processing according to the present exemplary embodiment to be described below is implemented such that the system control unit 50 executes the above-described programs recorded in the nonvolatile memory 56. A system memory 52 is, for example, a random access memory (RAM). Constants and variables for operations of the system control unit 50 and programs read from the nonvolatile memory 56 are loaded into the system memory 52. The system control unit 50 also performs display control by controlling the memory 32, the display unit 28, and the like.

A system timer 53 is a time measurement unit for measuring time to be used for various control operations and time of a built-in clock.

Various operation members each serving as an input unit that receives an operation from the user include at least the following operation units as an operation unit 70. The operation units includes the shutter button 61, the MC 65, the touch panel 70a, the main electronic dial 71, the sub-electronic dial 73, the cross key 74, the SET button 75, the video button 76, the AE lock button 77, the zoom button 78, the reproduction button 79, and the menu button 81. The mode selection switch 60 and the power switch 72 are also operation members that receive an operation from the user.

The operation unit 70, the mode selection switch 60, and the power switch 72 each function as an operation means for inputting various operation instructions to the system control unit 50.

The mode selection switch 60 changes an operation mode of the system control unit 50 to any one of a still image capturing mode, a moving image capturing mode, and the like. The still image capturing mode includes an automatic image capturing mode, an automatic scene determination mode, a manual mode, an aperture priority mode (Av mode), a shutter speed priority mode (Tv mode), and a program AE mode (P mode). The still image capturing mode further includes various scene modes as image capturing settings each for a different image capturing scene, and a custom mode. The mode selection switch 60 enables the user to directly select any one of these modes. Alternatively, the mode selection switch 60 may switch the screen to an image capturing mode list screen, and the user may select any one of the plurality of displayed modes and change the mode using other operation members. Similarly, the moving image capturing mode may also include a plurality of modes.

The shutter button 61 is a two-stage switch including a first shutter switch 62 and a second shutter switch 64.

The first shutter switch 62 turns on in the middle of an operation of the shutter button 61 provided on the digital camera 100, which is called halfway pressing (image capturing preparation instruction), to generate a first shutter switch signal SW1. The first shutter switch signal SW1 causes the system control unit 50 to start an imaging capturing preparation operation, such as AF processing, AE processing, AWB processing, and EF processing.

The second shutter switch 64 turns on upon completion of an operation of the shutter button 61, which is called full pressing (image capturing instruction), to generate a second shutter switch signal SW2. The second shutter switch signal SW2 causes the system control unit 50 to start a series of image capturing processing operations ranging from reading of a signal from the image capturing unit 22 to writing a captured image as an image file into the recording medium 200.

A power supply control unit 80 includes a battery detection circuit, a direct-current (DC) to DC (DC-DC) converter, and a switch circuit for selecting a block to be supplied with power, and detects an attachment of a battery, the battery type, and the remaining battery capacity. The power supply control unit 80 also controls the DC-DC converter based on the detection result and an instruction from the system control unit 50 to supply required voltages to the units, including the recording medium 200, for a required period of time. A power supply unit 30 includes a primary battery, such as an alkaline battery or a lithium (Li) battery, a secondary battery, such as a NiCd battery, a NiMH battery, or a Li battery, and an alternating current (AC) adaptor.

A recording medium interface (I/F) 18 is an interface to the recording medium 200, such as a memory card or a hard disk. The recording medium 200 is, for example, a memory card for recording captured images, and is composed of a semiconductor memory, a magnetic disk, or the like.

A communication unit 54 establishes a wireless connection or a wire cable connection to transmit and receive a video image signal and an audio signal. The communication unit 54 is connectable to a wireless local area network (LAN) and the Internet. The communication unit 54 can communicate with an external apparatus using Bluetooth® or Bluetooth® Low Energy. The communication unit 54 is configured to transmit images (including an LV image) captured by the image capturing unit 22 and images stored in the recording medium 200, and to receive images and other various information from an external apparatus.

An attitude detection unit 55 detects an attitude of the digital camera 100 in the gravity direction. Based on the attitude detected by the attitude detection unit 55, the system control unit 50 can determine whether the image captured by the image capturing unit 22 is an image captured with the digital camera 100 horizontally held or an image captured with the digital camera 100 vertically held. The system control unit 50 can append orientation information corresponding to the attitude detected by the attitude detection unit 55 to an image file of an image captured by the image capturing unit 22, or can rotate the image before recording. An acceleration sensor, a gyroscope sensor, and the like can be used as the attitude detection unit 55. Motions (e.g., pan, tilt, raising, and stand still) of the digital camera 100 can also be detected using the acceleration sensor and the gyroscope sensor serving as the attitude detection unit 55.

The eye approach detection unit 57 is an eye proximity detection sensor that detects (eye approach detection) a state where the eye (object) 161 approaches (comes into contact with) the eyepiece 16 of the finder (eye-proximity state) and a state where the eye (object) 161 is being detached from (comes out of contact with) the eyepiece 16 of the finder (eye out-of-proximity state). The system control unit 50 turns the display of the display unit 28 and the EVF 29 on (display state) or off (not display state) depending on the state detected by the eye approach detection unit 57. More specifically, at least in a case where the digital camera 100 is in the image capturing standby state and an automatic changeover setting is made as a changeover setting for the display destination of an LV image captured by the image capturing unit 22, the display unit 28 is turned on as the display destination in the out-of-proximity state, and the EVF 29 is not displayed. In the proximity state, the EVF 29 is turned on as the display destination, and the display unit 28 is not displayed. For example, an infrared proximity sensor can be used as the eye approach detection unit 57. The eye approach detection unit 57 can detect that some object is approaching the eyepiece 16 of the finder incorporating the EVF 29. If the object has approached the eyepiece 16, infrared light emitted from a light projecting portion (not illustrated) of the eye approach detection unit 57 is reflected and then received by a light-receiving portion (not illustrated) of the eye approach detection unit 57. The eye approach detection unit 57 can also determine a distance (eye proximity distance) from the eyepiece 16 to the object based on the amount of the received infrared light. In this manner, the eye approach detection unit 57 performs eye proximity detection for detecting the eye proximity distance from the object to the eyepiece 16. In the present exemplary embodiment, the light projecting portion and the light receiving portion of the eye approach detection unit 57 are devices different from the infrared light-emitting diode 166 and the line-of-sight detection sensor 164, respectively. However, the infrared light-emitting diode 166 may also serve as the light projecting portion of the eye approach detection unit 57, and the line-of-sight detection sensor 164 may serve as the light receiving portion. In a case where an object approaching the eyepiece 16 at a predetermined distance or less is detected in the eye out-of-proximity state (non-approach state), the eye approach detection unit 57 determines that the eye has approached the eyepiece 16. In a case where an object in the eye-proximity state (approach state) has been detached from the eyepiece 16 by a predetermined distance or more, the eye approach detection unit 57 determines the eye has separated from the eyepiece 16. Different values may be used as a threshold for detecting the eye-proximity state and a threshold for detecting the eye out-of-proximity state, respectively, for example, by setting a hysteresis. Once the eye-proximity state is detected, the eye-proximity state continues until the eye out-of-proximity state is detected. Once the eye out-of-proximity state is detected, the eye out-of-proximity state continues until the eye-proximity state is detected. The infrared proximity sensor is an example of the eye approach detection unit 57. Other sensors configured to detect an approach of an eye or object with which the eye-proximity state can be determined may be employed as the eye approach detection unit 57.

The system control unit 50 can detect the following operations or states based on the output from the line-of-sight detection block 160.

A state where a new line of sight of the user's eye in proximity to the eyepiece 16 is input (detected), i.e., the user starts the line-of-sight input.

A state where the line of sight of the user's eye in proximity to the eyepiece 16 is being input.

A state where the user's eye in proximity to the eyepiece 16 is gazing.

A state where the user's eye in proximity to the eyepiece 16 shifts the line of sight, i.e., the user ends the line-of-sight input.

A state where the user's eye in proximity to the eyepiece 16 is not performing the line-of-sight input.

The term "gaze" used herein refers to a state where the line-of-sight position of the user does not exceed a predetermined movement amount within a predetermined period of time.

The touch panel 70a and the display unit 28 can be integrally formed. For example, the touch panel 70a is configured to have a light transmittance that does not interfere with the display on the display unit 28, and is disposed on an upper layer of the display surface of the display unit 28. Input coordinates on the touch panel 70a are associated with display coordinates on the display screen of the display unit 28. This makes it possible to provide such a graphical user interface (GUI) that virtually allows the user to directly operate the screen displayed on the display unit 28. The system control unit 50 can detect the following operations on the touch panel 70a, or the states thereof.

An operation to newly touch the touch panel 70a with a finger or a pen that has not been in contact with the touch panel 70a, i.e., to start touching (hereinafter referred to as a "touch-down")

A state where the finger or the pen is in contact with the touch panel 70a (hereinafter referred to as a "touch-on")

An operation to move the finger or the pen while being in contact with the touch panel 70a (hereinafter referred to as a "touch-move")

An operation to detach the finger or the pen that has been in contact with the touch panel 70a from the touch panel 70a, i.e., to end touching (hereinafter referred to as a "touch-up")

A state where the finger or the pen is out of contact with the touch panel 70a (hereinafter referred to as a "touch-off")

When a touch-down is detected, a touch-on is also detected at the same time. After the touch-down, the touch-on is normally kept being detected until a touch-up is detected. A touch-move is detected in a state where the touch-on is detected. Even when the touch-on is detected, a touch-move is not detected if the touch position is not moving. After a touch-up is detected for all fingers and the pen that have been in contact with the touch panel 70a, a touch-off is detected.

A notification about the above-described operations and states and position coordinates of a position where a finger or a pen contacts the touch panel 70a is provided to the system control unit 50 via an internal bus. Based on the notification information, the system control unit 50 determines what kind of operation (touch operation) has been performed on the touch panel 70*a*. For a touch-move, the moving direction of the finger or the pen moving on the touch panel 70*a* can be determined for each of vertical and horizontal components on the touch panel 70*a* based on changes of the position coordinates. In a case where a touch-move by a predetermined distance or more is detected, the system control unit 50 determines that a slide operation has been performed. An operation to quickly move the finger by a certain distance while being in contact with the touch panel 70*a* and then release the finger from the touch panel 70*a* is referred to as a flick. In other words, a flick is an operation to quickly flip the surface of the touch panel 70*a* with the finger. In a case where a touch-move at a predetermined speed or higher by a predetermined distance or more is detected and then a touch-up is subsequently detected, it can be determined that a flick has been performed (it can be determined that a flick has been performed following a slide operation). A touch operation to simultaneously touch a plurality of positions (e.g., two positions) and bring these positions close to each other is referred to as a "pinch-in". A touch operation to move these positions away from each other is referred to as a "pinch-out". A pinch-out and a pinch-in are collectively referred to as a pinch operation (or simply referred to as a "pinch"). The touch panel 70*a* may be any one of various types of touch panels, including a resistive touch panel, a capacitive touch panel, a surface acoustic wave touch panel, an infrared touch panel, an electromagnetic induction touch panel, an image recognition touch panel, and a photosensor touch panel. Examples of the touch detection method may include a method of detecting a touch when the finger or the pen comes into contact with the touch panel 70*a*, and a method of detecting a contact when the finger or the pen approaches the touch panel 70*a*.

When a touch-move operation is performed in the eye-proximity state, the user can set one of absolute position designation and relative position designation as a method for designating the position of a position index according to the touch-move operation. For example, assuming that an AF frame is set as the position index, when the absolute position designation is set and the touch panel 70*a* is touched, an AF position associated with the touched position (position where coordinates are input) is set. In other words, position coordinates where the touch operation is performed are associated with position coordinates of the display unit 28. On the other hand, when the relative position designation is set, position coordinates where the touch operation is performed are not associated with position coordinates of the display unit 28. In the relative position designation, the touch position is moved by a distance corresponding to the movement amount of the touch-move operation in the movement direction of the touch-move operation from the AF position currently set, regardless of the touch-down position on the touch panel 70*a*.

Setting Screen

FIGS. 3A to 3D each illustrate a menu for changing setting values displayed on the display unit 28 or the EVF 29.

FIG. 3A illustrates a menu setting screen including setting items 301 to 305 indicating setting values, respectively.

The setting item 301 indicates an AF operation in which "one shot AF" for locking the focus after AF is activated (after the image capturing preparation instruction is issued) and "servo AF" for tracking the focus can be set.

The setting item 302 indicates an AF area in which the size of the AF area can be set. In the case of setting a large number of setting values, a dedicated screen (FIG. 3B) is used to set the setting values in a deeper layer. As illustrated in FIG. 3B, the user selects the setting value 306 from among the displayed setting values.

The setting item 303 indicates a tracking setting for setting whether to implement tracking after AF is activated (after the image capturing preparation instruction is issued). An object to be tracked is determined from the AF area before AF is activated (before the image capturing preparation instruction is issued), and tracking is performed on the entire screen by increasing the size of the AF area to the entire area after AF is activated (after the image capturing preparation instruction is issued). According to this setting, when a main object is detected, a detection frame is displayed for the main object to provide a notification about the detected main object to the user. The main object is determined based on the setting of the object to be detected in the setting item 304.

The setting item 304 indicates the setting of the object to be detected. A type of a detection target to be prioritized to determine the main object is selected in the setting item 304. In the present exemplary embodiment, as illustrated in FIG. 3D, any one of types 310, that is, "person", "animal priority", "vehicle priority", and "OFF" can be set. As indicated by item 311 in FIG. 3D, advanced settings can be made depending on the setting values. In this case, the image processing unit 24 can execute object detection processing for detecting a specific object using captured image data. In the present exemplary embodiment, examples of the specific object to be detected include a person, an animal, such as a dog or wild bird, a vehicle, and a part corresponding to a main area in the object (spot detection). For example, when spot detection is performed on a person, the body, head, pupil, and face of the person are detected. For example, when spot detection is performed on an animal, the pupil, face, and body of the animal are detected. In the spot detection, for example, when "vehicle priority" is selected, local spots can be set and a driver in a vehicle, a first vehicle of a train (railway), and a cockpit in an aircraft are detected. For these detection methods, a learning method using machine learning, recognition processing by image processing, and the like are used.

For example, the following types of machine learning are used.

(1) Support Vector Machine
(2) Convolutional Neural Network
(3) Recurrent Neural Network As an example of recognition processing, in the case of detecting a face, for example, a skin color area may be extracted from gradation colors in each pixel represented by image data and the face is detected based on the degree of matching with a prepared face contour plate. In addition, a face detection method in which face feature points corresponding to the eyes, nose, mouse, and the like are extracted by a known pattern recognition technique can also be employed. Further, the main area detection method according to the present exemplary embodiment is not limited to the above-described methods, and any other methods can also be employed.

As illustrated in FIG. 3C, a screen on which AF area setting 309 and tracking setting 308 are simultaneously made can also be set. In this case, an LV through image is displayed on the background and the user can change the settings while viewing the display of an AF area 307.

Button Customization Function

FIGS. 4A to 4E each illustrate a menu for setting a button customization function for tracking activation and function call to be displayed on the display unit 28 or the EVF 29.

Figure 4A:
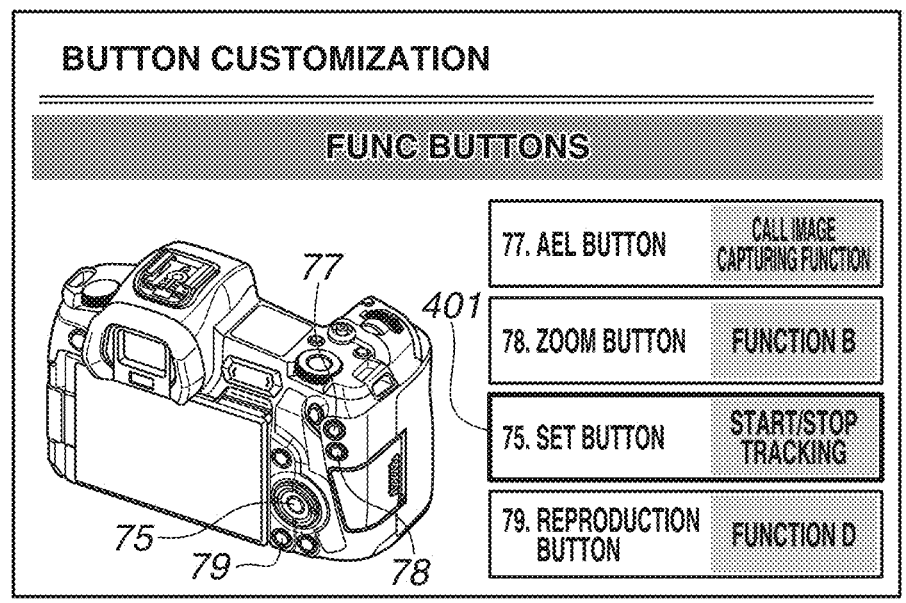
Figure 4B:
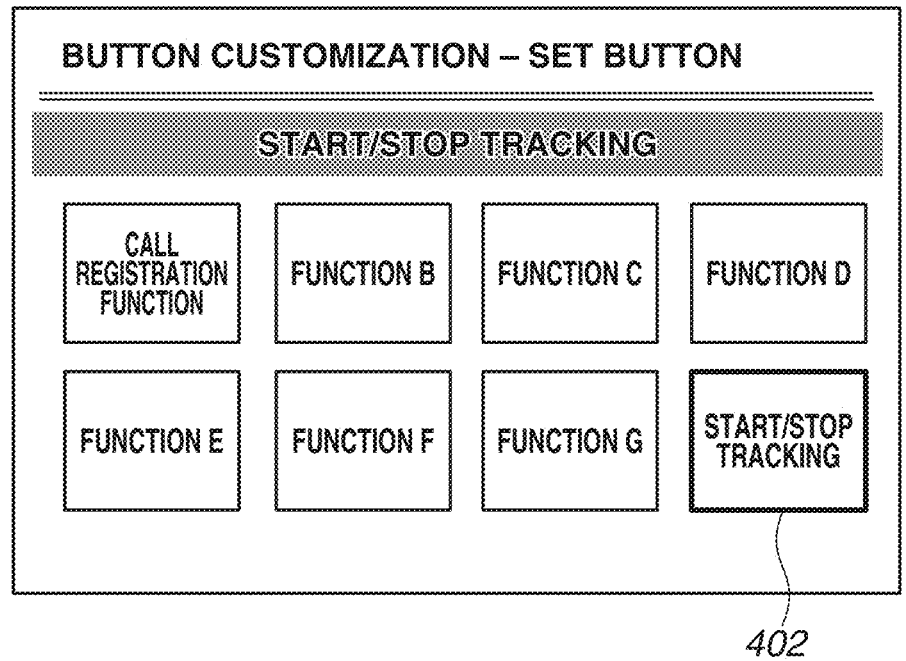

To customize a tracking activation button, for example, as indicated by an item 401 in FIG. 4A, when the user moves a cursor (index) indicating a current processing target position to an operation member (e.g., a button) on the screen to which a function is to be allocated, the allocatable functions are displayed in a selectable manner as indicated by an item 402 in FIG. 4B. In FIG. 4B, "start/stop tracking" is allocated to the SET button. The function to "start/stop tracking" corresponds to a function of starting tracking based on the position of the AF area and a function of stopping the tracking that has been started, regardless of the tracking setting. This function can be activated in the image capturing standby state (SW0), during activation of AF (first shutter switch signal SW1 is held or ON), and during servo AF continuous shooting (SW2 ON).

For example, as indicated by an item 403 in FIG. 4C, when the user moves the cursor to the button on the screen to which a function is to be allocated, the allocatable functions are displayed in a selectable manner as indicated by an item 404 in FIG. 4D. In FIG. 4D, "call registration function" is allocated to an AE lock (AEL) button.

The function of "call registration function" is a function for calling a function that is preliminarily registered by the user. When an item 405 illustrated in FIG. 4D is pressed by the user, an advanced settings screen illustrated in FIG. 4E opens. A checkbox 406 illustrated in FIG. 4E enables the user to register a function to be called by setting a setting item 407 and a setting value 408 to be called and by checking the checkbox 406. In FIG. 4E, "one shot" is set as an AF operation and "home position (HP)" is registered as a call position. A gray-out display may be performed to indicate that an item cannot be registered during setting of another item. For example, the AF area illustrated in FIG. 4E is grayed out to indicate that the AF area cannot be registered. For example, like in the tracking setting and spot detection illustrated in FIG. 4E, if the user cannot check the corresponding checkbox, the current setting value cannot be changed.

Image Capturing Information Display and Icons Indicating Setting Values

Figures 5A, 5B:
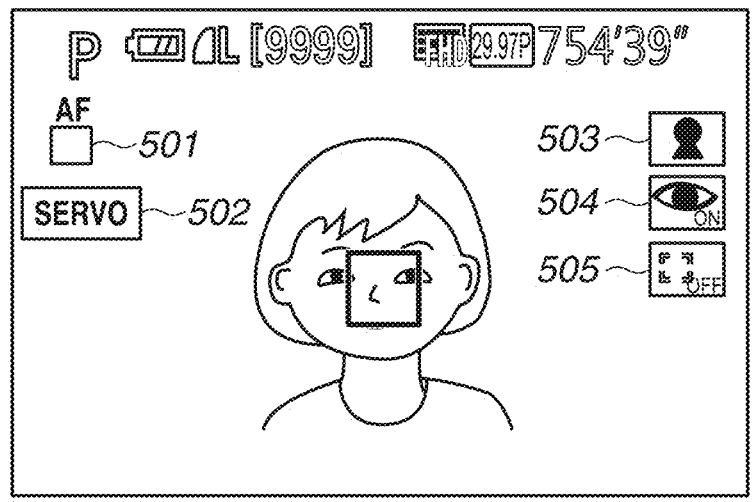
FIGS. 5A and 5B illustrate an image capturing information display and icons indicating setting values, respectively.

FIGS. 5A and 5B illustrate an image capturing information display to be displayed on the display unit 28 or the EVF 29 and icons indicating setting values, respectively.

FIG. 5A illustrates an example of a display screen of the display unit 28. The display screen includes an icon 501 indicating an AF area and a tracking setting, an icon 502 indicating an AF operation setting, an icon 503 indicating a setting of an object to be detected, an icon 504 indicating a pupil detection setting, and an icon 505 indicating a tracking activation state. The user can check the current settings and states by checking the icons 501 to 505.

FIG. 5B illustrates an example of an icon display list. As indicated by an item 506, the icon 501 is represented by a combination of an AF area and a tracking setting. As indicated by items 507, 508, and 509, the icons 502 to 504 that are prepared according to the setting values are displayed. As indicated by an item 510, the icon 505 indicating a tracking control state is displayed.

Frame Display Before and After Activation of AF

FIG. 6 illustrates a display of each frame before and after activation of AF to be displayed on the display unit 28 or the EVF 29.

FIG. 6 illustrates an example where the display of the frame before AF is activated is different from that after AF is activated. However, the frame may be displayed in the same manner before and after AF is activated. The display of the frame may be changed using colors such that, for example, green is used when "one shot" is set as the AF operation, and blue is used when "servo AF" is set.

An AF area frame 601 represents a narrow area such as a spot, one point, or a zoom area. The AF area frame 601 is represented by a rectangular shape before AF is activated, and is represented by a bold rectangular shape after AF is activated as indicated by an AF area frame 602 in FIG. 6.

An AF area frame 603 represents a wide area such as a zone or an entire area. The AF area frame 603 is represented by an area square brackets before the AF is activated. After AF is activated, a small rectangular frame 604 is displayed in an in-focus portion within the area of the AF area frame 603. Additionally, a plurality of rectangular frames 604 may be displayed within the area of the AF area frame 603. If the AF area frame 603 indicates the entire area of the screen, for example, when "entire area" is set, the display of the AF area frame (brackets) 603 may be omitted before the AF is activated.

A frame 605 represents a detection frame. The frame 605 is displayed for an automatically detected specific object by setting the specific object as a target to be detected. In FIG. 6, "person" is set and the frame is displayed at a position corresponding to the face of the person. The detection frame 605 can also be displayed on the pupil area in the pupil detecting setting. If "animal" and "vehicle" are set, the detection frame 605 is displayed for the entire body and face of the animal and the vehicle. After AF is activated, a rectangular frame display 606 corresponding to the detection frame 605 is performed. In the present exemplary embodiment, the frame display 606 is represented by a dotted line so that the frame display 606 can be distinguished from the AF area frame 602. Each detection frame can be updated and the object can be tracked. However, the frame position is fixed at the in-focus position after one-shot AF is activated.

A frame 607 represents a tracking frame. The frame 607 is displayed when the user selects the detection frame 605, or when a tracking target is selected by a user operation. Examples of various types of user selection operation include selection based on an operation position on the touch panel 70a, selection by a tracking start operation, and selection of the detection frame 605 using a cross button. After AF is activated, a dotted-line double rectangular frame 608 is displayed. Like the detection frame, each tracking frame can be updated and the object can be tracked. However, the frame position is fixed at the in-focus position after one-shot AF is activated.

A frame 609 represents an HP frame. The user stores the HP frame 609 by setting the AF area frames 601 and 603 at desired positions to be registered and by performing a registration operation. The HP frame 609 can be called by selecting "call HP" or "call image capturing function" on the button customization screen. The HP frame 609 can be called, for example, during an operation, or during a continuous period of time until the call is performed again. After AF is activated, the HP frame 609 is represented by a bold rectangular shape 610, like the AF area.

Representation of Frame Based on Combination of AF Area and Tracking Setting

Figure 7:
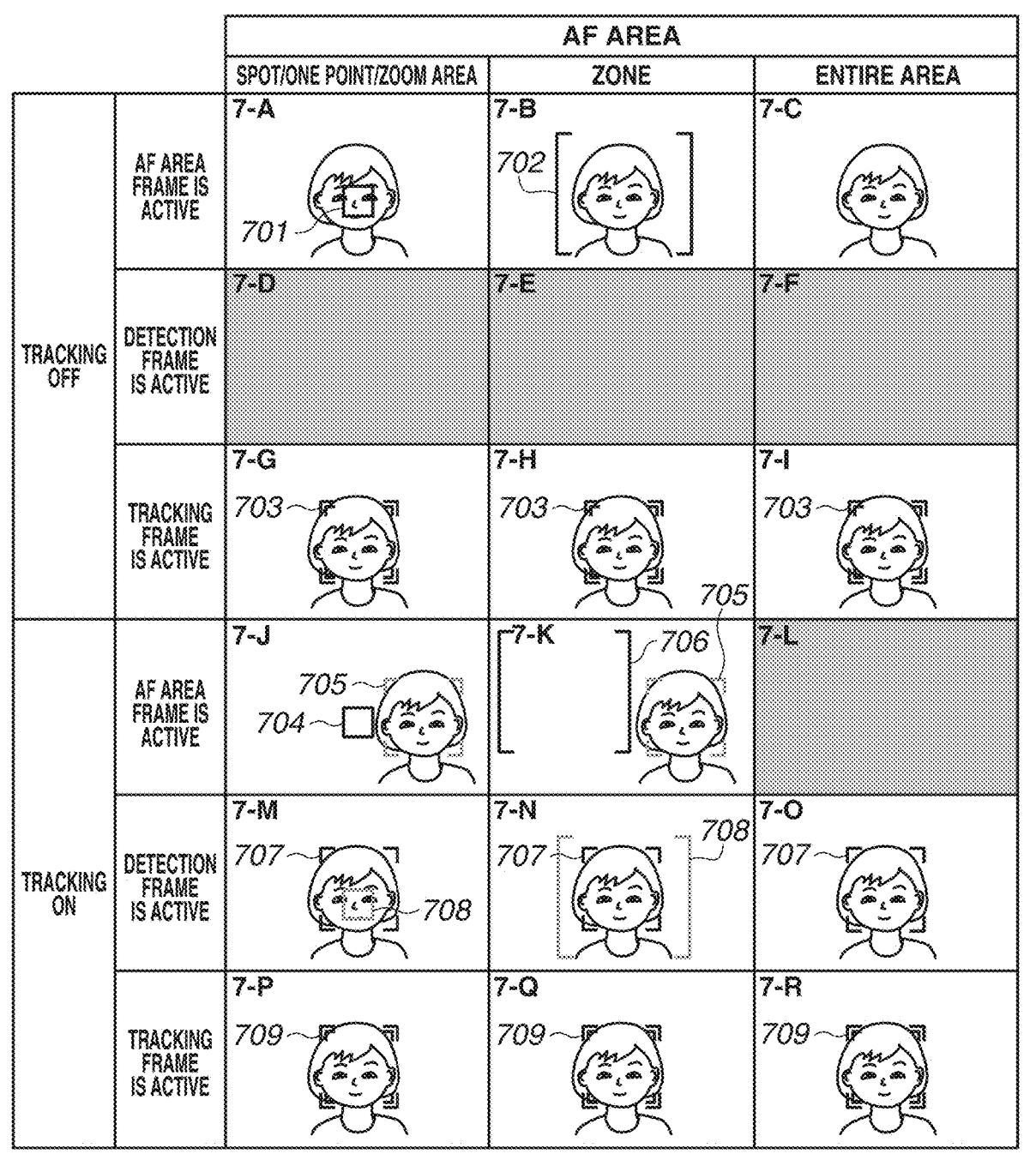

FIG. 7 illustrates an example of frame representation based on a combination of an AF area and a tracking setting.

When tracking is "OFF", states 7-A to 7-I each indicating the tracking setting and the AF area are displayed, and when tracking "ON", states 7-J to 7-R each indicating the tracking setting and the AF area are displayed. FIG. 7 illustrates conditions when "AF area frame", "detection frame", and "tracking frame" are active.

A case where tracking is "OFF" in the states 7-A to 7-I will now be described.

When the AF area frame is active, the AF area frame, such as a one-point AF area frame 701 or a zone AF area frame 702, is displayed according to each setting (7-A, 7-B, 7-C).

When tracking is "OFF", object detection is not performed and thus the detection frame is not active. Accordingly, no frame is displayed in the states 7-D, 7-E, and 7-F. For convenience of explanation, the screen area corresponding to the states 7-D, 7-E, and 7-F illustrated in FIG. 7 is grayed out and LV display is performed.

When tracking is selected and performed by the user, a tracking frame 703 is displayed (7-G, 7-H, 7-I). In this case, the tracking frame corresponds to, for example, a tracking frame set when tracking is started based on an operation position on the touch panel 70a, or a tracking frame set when tracking is started based on a tracking start operation position.

Next, a case where tracking is "ON" in the states 7-J to 7-R will be described.

In the states 7-J to 7-O, when tracking is "ON" and a main object is detected, both the AF area frame and the detection frame are displayed and a frame to be actually focused during activation of AF is active. If the main object is not detected, the AF area frame is displayed, like in the case where tracking is "OFF".

The frame to actually focus on during activation of AF when the main object is detected is selected in the following manner.

First, in a condition where the detection frame does not overlap the AF area frame, the AF area frame is active (7-J, 7-K, 7-L). If the AF area corresponds to the entire area of the screen, based on the condition that the detection frame does not overlap the AF area frame even when the object is not detected in the AF area, the AF area entire area is active (7-L). In this case, however, since the entire screen area is set as the AF area, the frame display is not performed. Accordingly, for convenience of explanation, the screen area corresponding to the AF area 7-L is grayed out, but LV display is performed. When the AF area frame is active, the AF area frames 704 and 706 are represented by a solid line and the detection frame is represented by a transparent line 705. During activation of AF, a focus adjustment is performed on the AF area frame.

Next, in a condition where the detection frame overlaps the AF area frame, the detection frame is active (7-M, 7-N, 7-O). For example, in the case of pupil detection or spot detection, if the face or entire body constituting the object overlaps the AF area frame even when the pupil or spot area of the object does not overlap the AF area, the detection frame can be activated in some cases. When the detection frame is active, the detection frame is represented by a solid line 707 and the AF area frame is represented by a transparent line 708.

In a case where tracking is selected and to be performed by the user and tracking is "ON", when a main object is detected, the tracking frame is active and the tracking frame is displayed (709) during execution of tracking (7-P, 7-Q, 7-R). When the main object is not detected, the tracking frame is displayed, like in the case where tracking is "OFF".

State Transition Among Image Capturing Standby State, Image Capturing Preparation State, and Image Capturing State FIG. 8A illustrates state transition among an image capturing standby state (8-A, 8-D), an image capturing preparation state (8-B, 8-E), and an image capturing state (8-C, 8-F).

An icon 801 indicates a setting value for AF area×tracking setting. An icon 802 indicates a setting value for AF operation. An icon 803 indicates a setting value for an object to be detected. An icon 804 indicates a setting value for pupil detection. An icon 805 indicates a tracking state. A frame display 806 indicates an AF area for zone AF.

A frame display 807 indicates a detection frame for an object to be detected. In the example illustrated in FIG. 8A, the object is detected in the AF area, and thus the detection frame is active and the AF area is not active. In the state of 8-A (see FIG. 7), when an operation 8a of AF start (SW1) is performed, the state transitions to 8-B. In this case, an AF operation is executed in the active frame area.

In the state of 8-B, in-focus display is performed by a frame 808. Since one shot is set as the AF operation, the frame position is locked. A notification about an in-focus state is provided to the user by changing colors such that green is used for the in-focus state and red is used for a not-in-focus state. When an operation 8b of image capturing start (SW2) is performed, the state transitions to 8-C.

In the state of 8-C, image capturing is performed. A frame 809 indicates that image capturing is being executed. In the present exemplary embodiment, the frame 809 is not displayed in some cases because it can be determined that image capturing is being executed based on image capturing sound. However, during silent image capturing, the frame 809 is displayed in many cases. Since the focus is locked during continuous shooting in the one-shot AF image capturing operation, the frame 808 performed at SW1 is not performed.

The state transition in the basic image capturing operation has been described above. Next, function call patterns will be described.

In the state of 8-A, when an operation 8c of image capturing function call is performed, the state transitions to 8-D. In this case, the icon 801 changes to "entire area× tracking", the icon 802 changes to "servo AF", the icon 803 changes to "animal priority", and the icon 804 changes to "pupil detection OFF". After the call operation, animal detection is performed on the entire area. Accordingly, a little bird located at the lower right position is detected as a main object, and a detection frame 810 is displayed. Since the entire area is set as the AF area, the detection frame 810 is an active frame.

In the state of 8-A, when an operation 8d of image capturing function call is performed, the state transitions to 8-E. The display and the like in the operation 8d are similar to those in the operation 8c. The operation 8d differs from the operation 8c in that the AF operation is simultaneously executed and an in-focus frame 811 is displayed after AF is executed. The operation 8d can also be executed in the states 8-B and 8-C, and the states transition as illustrated in FIG. 8A.

In the state of 8-D, when the AF operation is executed by the operation 8a, the state transitions to 8-E. In a case where the tracking setting is "ON" and "servo AF" is set as the AF operation, the AF area is expanded to the entire area and then the object is tracked during a period in which the AF operation is held. If object tracking is to be cancelled, the AF operation is stopped or the "stop tracking" operation is performed on the button customization screen.

In the state of 8-E, when image capturing is started by the operation 8b, the state transitions to 8-F. In servo continuous shooting, image capturing is repeated by continuously focusing on the object while tracking the object.

FIG. 8B illustrates a menu set by the button customization function described above with reference to FIGS. 4A to 4E. A menu called by the operation 8c is displayed on the left side of FIG. 8B, and a menu called by the operation 8d is displayed on the right side of FIG. 8B.

Call Patterns

Figure 9A:
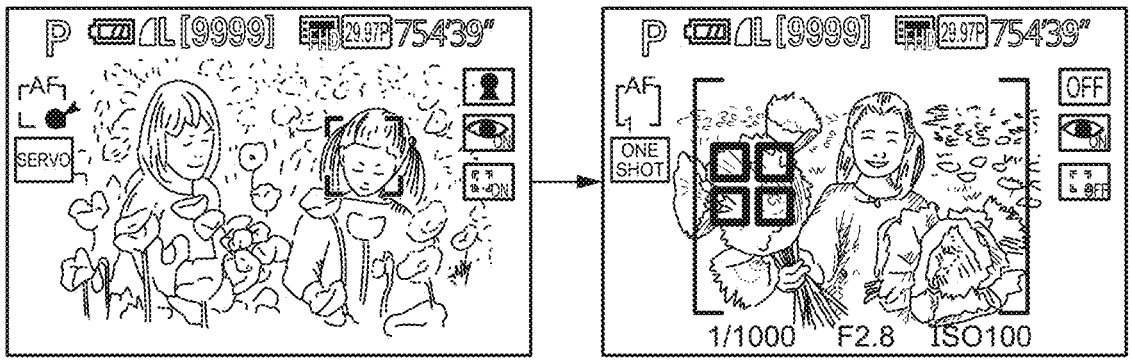
FIGS. 9A to 9C illustrate patterns for implementing a function call.
Figure 9B:
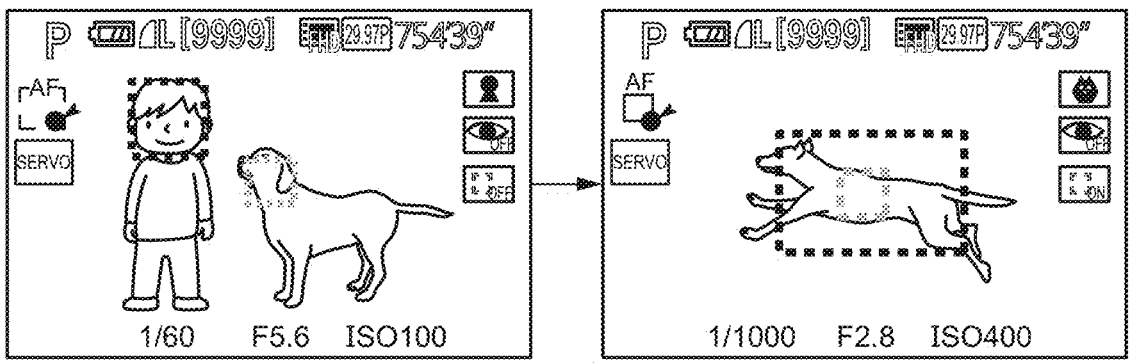
Figure 9C:
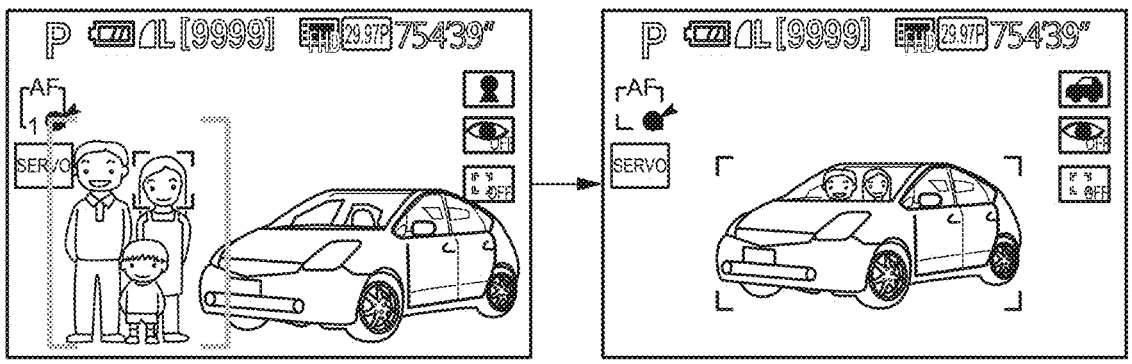

FIGS. 9A to 9C illustrate three call patterns, respectively, according to the present exemplary embodiment.

FIG. 9A illustrates a pattern in which "zone×tracking OFF×detection OFF" is called from "entire area×person detection". Before the call operation, image capturing is performed by prioritizing "person" over the other types on the entire area. Since the object moves with a large motion, image capturing is performed in the servo mode. In the case of capturing an image mainly of an object rather than a person, the detection setting is turned off and auto selection is performed in a specific area. At the same time, AF can be started and image capturing can be performed in a procedure, for example, image capturing can be performed immediately after a one-shot call. The display illustrated in FIG. 9A is effective when flowers displayed on the frontmost side in the area are focused. This display is effective, for example, when the object is switched to a bouquet tossed by a bride in bouquet toss during a wedding ceremony.

FIG. 9B illustrates a pattern in which "one point (HP)× tracking ON×animal detection" is called from "entire area× person detection". Before the call operation, image capturing is performed by prioritizing "person" over the other types on the entire area. In case an object with a large motion appears, one point is registered as HP in the vicinity of the center as a point where servo AF is started. In this state, even if an object with a large motion, such as an animal, appears, this function is called to catch the object from the area in the vicinity of the center and start tracking. Even if a rapidly moving dog appears as illustrated in FIG. 9A, the object can be caught at the center, thereby enabling tracking of the object. The size (one point, zone) and position of HP can be stored. This increases options for image capturing by calling the size and position of HP simultaneously with the detection setting.

FIG. 9C illustrates a pattern in which "entire area×vehicle detection" is called from "zone×person detection". This is effective when image capturing is performed, before the call operation, prioritizing "person" over the other types on the entire area, then performing image capturing by changing the main object to a vehicle. Not only an automobile, but also a motorcycle, a train, an aircraft, and the like can be detected as a vehicle. This pattern is also effective in ceremonial image capturing, circuit image capturing, and event image capturing. Also, pinpoint focusing in the vehicle can be performed using the spot detection settings described above with reference to FIGS. 3A to 3D.

There are other effective scenes in addition to the above-described effective scenes. When a combination of an AF area and a detection setting is called, user's customization performance can be enhanced and image capturing can be performed without missing a shot.

Control Flow to Call Combination of Object Detection Type and AF Area

FIG. 10A is a flowchart illustrating a control operation according to the present exemplary embodiment. Each process is implemented such that the system control unit 50 loads programs stored in the nonvolatile memory 56 into the system memory 52 and executes the programs.

In the following flowchart, processing and control operation are performed by the system control unit 50.

In step S1001, it is determined whether a function call is performed. If the function call is performed (YES in step S1001), the processing proceeds to step S1002. If the function call is not performed (NO in step S1001), the processing proceeds to step S1003.

In step S1002, control for the function call is started.

In step S1003, it is determined whether an AF operation (SW1) is performed. If the AF operation is performed (YES in step S1003), the processing proceeds to step S1004. If the AF operation is not performed (NO in step S1003), the processing returns to step S1001. During this process, if normal image capturing preparation settings (exposure change, AF area movement, and other settings) are made, the settings are changed.

In step S1004, the AF operation is executed. In the one shot AF setting, the focus position is fixed after completion of AF, and the focus is tracked also after completion of AF in the servo AF setting.

In step S1005, it is determined whether a function call is performed. If the function call is performed (YES in step S1005), the processing proceeds to step S1006. If the function call is not performed (NO in step S1005), the processing proceeds to step S1008.

In step S1006, control for the function call is started.

In step S1007, the AF operation is executed. If the setting value is not changed in step S1006, the AF operation in step S1007 is skipped.

In step S1008, it is determined whether an image capturing operation (SW2) is performed. If the image capturing operation is performed (YES in step S1008), the processing proceeds to step S1010. If the image capturing operation is not performed (NO in step S1008), the processing proceeds to step S1009.

In step S1009, it is determined whether the AF operation (SW1) is held. If the AF operation is held (YES in step S1009), the processing returns to step S1005. If the AF operation is not held (NO in step S1009), the processing returns to step S1001.

In step S1010, an image capturing operation is executed.

In step S1011, it is determined whether a function call is performed. If the function call is performed (YES in step S1011), the processing proceeds to step S1012. If the function call is not performed (NO in step S1011), the processing proceeds to step S1017.

In step S1012, it is determined whether a servo AF operation is being executed. If the servo AF operation is being executed (YES in step S1012), the processing proceeds to step S1014. If the servo AF operation is not being executed (NO in step S1012), the processing proceeds to step S1013.

In step S1013, it is determined in advance whether the AF operation is changed in the function call. If the AF operation is changed (YES in step S1013), the processing proceeds to step S1015. If the AF operation is not changed (NO in step S1013), the processing proceeds to step S1017.

In steps S1014 and S1015, control for the function call is started.

In step S1016, the AF operation is executed. If the setting values are not changed in steps S1014 and S1015, the AF operation in step S1016 is skipped.

In step S1017, it is determined whether to perform continuous image capturing. If continuous image capturing is to be performed (YES in step S1017), the processing proceeds to step S1018. If continuous image capturing is not to be performed (NO in step S1017), the processing proceeds to step S1019.

In step S1018, the image capturing operation is executed. In this case, since continuous image capturing is executed, image capturing is performed according to the current driving setting.

In step S1019, it is determined whether image capturing is completed. If image capturing is completed (YES in step S1019), the processing in the flowchart is terminated. If image capturing is not completed (NO in step S1019), the processing returns to step S1011.

Function Reading Control Flow

Figure 10B:
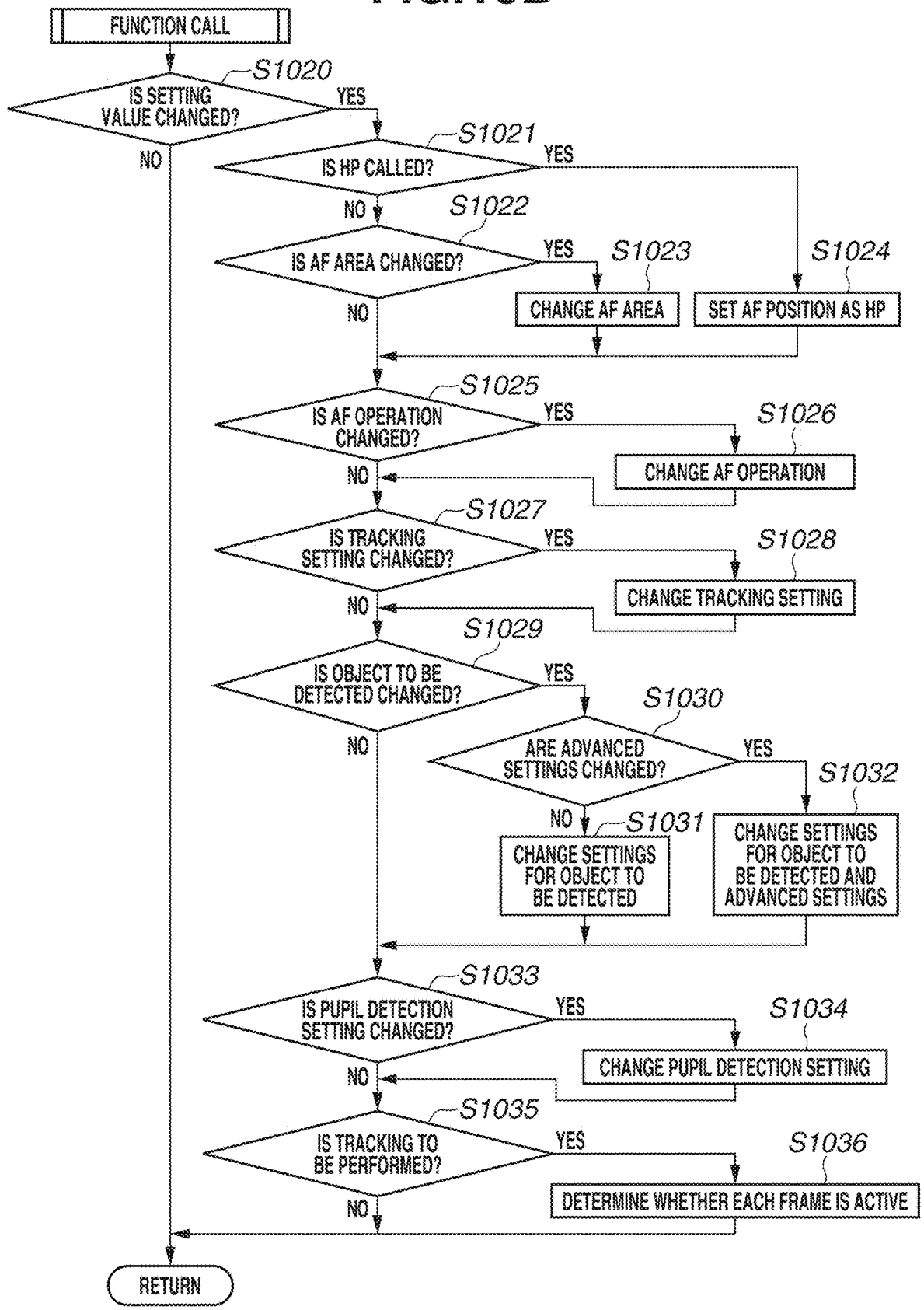
FIG. 10B is a flowchart illustrating details of the function call.

FIG. 10B is a flowchart illustrating details of the function reading processes in steps S1002, S1006, S1014, and S1015 illustrated in FIG. 10A. Each process is implemented such that the system control unit 50 loads programs stored in the nonvolatile memory 56 into the system memory 52 and executes the programs.

In the following flowchart, processing and control operation are performed by the system control unit 50.

In step S1020, it is determined whether the setting value is changed. If the setting value is changed (YES in step S1020), the processing proceeds to step S1021. If the setting value is not changed (NO in step S1020), the function call sub-flow ends.

In step S1021, it is determined whether HP is called. If HP is called (YES in step S1021), the processing proceeds to step S1024. If HP is not called (NO in step S1021), the processing proceeds to step S1022.

In step S1022, it is determined whether the AF area is changed. If the AF area is changed (YES in step S1022), the processing proceeds to step S1023. If the AF area is not changed (NO in step S1022), the processing proceeds to step S1025.

In step S1023, the AF area is changed.

In step S1024, the AF position is set as HP.

In step S1025, it is determined whether the AF operation is changed. If the AF operation is changed (YES in step S1025), the processing proceeds to step S1026. If the AF operation is not changed (NO in step S1025), the processing proceeds to step S1027.

In step S1026, the AF operation is changed.

In step S1027, it is determined whether the tracking setting is changed. If the tracking setting is changed (YES in step S1027), the processing proceeds to step S1028. If the tracking setting is not changed (NO in step S1027), the processing proceeds to step S1029.

In step S1028, the tracking setting is changed.

In step S1029, it is determined whether the setting of the object to be detected is changed. If the setting of the object to be detected is changed (YES in step S1029), the processing proceeds to step S1030. If the setting of the object to be detected is not changed (NO in step S1029), the processing proceeds to step S1033.

In step S1030, it is determined whether advanced settings in the setting of the object to be detected are changed. If the advanced settings are changed (YES in step S1030), the processing proceeds to step S1032. If the advanced settings are not changed (NO in step S1030), the processing proceeds to step S1031.

In step S1031, the setting of the object to be detected is changed.

In step S1032, the setting of the object to be detected and the advanced settings are changed.

In step S1033, it is determined whether the pupil detection setting is changed. If the pupil detection setting is changed (YES in step S1033), the processing proceeds to step S1034. If the pupil detection setting is not changed (NO in step S1033), the processing proceeds to step S1035.

In step S1034, the pupil detection setting is changed.

In step S1035, it is determined whether a tracking operation is to be performed. If the tracking operation is to be performed (YES in step S1035), the processing proceeds to step S1036. If the tracking operation is not to be performed (NO in step S1035), the function call sub-flow ends.

In step S1036, it is determined whether each frame is active based on FIG. 7, and the main object is determined based on the AF setting and detection setting after the call operation.

The above-described state transitions and flowcharts based on the exemplary embodiments enable the user to perform comfortable image capturing by calling various combinations of image capturing settings and detection settings, which leads to an improvement in operability.

Especially, the present exemplary embodiment is effective as a method for determining image capturing conditions in a digital camera, and this method enables the user to perform comfortable image capturing without missing a shot.

While the present exemplary embodiment illustrates an example where a display frame is represented by a rectangle as an index for indicating a position or size on a screen, the index is not limited to a rectangle, but instead may be any shape such as a circle or hexagonal shape. Alternatively, a target display such as a cross indicating a position may be used.

The system control unit 50 can generate metadata based on image capturing conditions as a combination of the image capturing setting and the detection setting, and can record the generated metadata by adding it to image data captured by the image capturing unit 22 on the recording medium 200. In the case of displaying recorded images, the metadata recorded in association with the image data may be displayed. The image data, metadata, and the like to be recorded are recorded based on standards such as an Exchangeable Image File Format (Exif).

The above-described various control operations that have been described to be performed by the system control unit 50 may be performed by one piece of hardware or by controlling the entire apparatus by sharing processing among a plurality of pieces of hardware.

While the disclosure has been described in detail above based on exemplary embodiments, the disclosure is not limited to these specific exemplary embodiments. Various modifications made without departing from the scope of the invention are also included in the disclosure. Further, the above-described exemplary embodiments are merely examples of the disclosure, and the exemplary embodiments can be combined as appropriate.

While the exemplary embodiments described above illustrate an example where the disclosure is applied to the digital camera 100, the disclosure is not limited to this example. The disclosure can be applied to any display control apparatus, as long as the display control apparatus can perform control for image processing. Specifically, the disclosure can be applied to a mobile phone terminal, a portable image viewer, a personal computer (PC), a printer apparatus including a finder, a home electric appliance including a display unit, a digital photo frame, a projector, a tablet PC, a music player, a game console, an electronic book reader, and the like.

According to an exemplary embodiment, it is possible to immediately change settings on the basis of object detection.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)?), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-098472, filed Jun. 14, 2021, which is hereby incorporated by reference herein in its entirety.

What is claimed is:

1. An apparatus comprising:
one or more processors that execute a program stored in a memory and thereby function as:
a first setting unit configured to set a first item relating to a type of a detection target;
a second setting unit configured to set a second item relating to an autofocus (AF) area;
an object detection unit configured to execute object detection processing on an object of the type set by the first setting unit;
a focus detection unit configured to execute focus detection processing based on information about the AF area set by the second setting unit; and
a storage unit configured to store the settings as a combination of the set first item and the set second item,
wherein the stored settings are called by a user through a specific operation, and the object detection processing and the focus detection processing are executed based on the called settings, and
wherein the second item is relating to a size of the AF area.

2. The apparatus according to claim 1, wherein the first setting unit sets at least one of a person, an animal, and a vehicle as the type of the detection target.

3. The apparatus according to claim 2, wherein the first setting unit further sets a specific part to the type of the detection target.

4. The apparatus according to claim 3, wherein in a case where the type of the detection target is a person, the specific part is at least one of a pupil, a face, a head, and a body of the person.

5. The apparatus according to claim 3, wherein in a case where the type of the detection target is an animal, the specific part is at least one of a pupil, a face, and an entire body of the animal.

6. The electronic apparatus according to claim 3, wherein in a case where the type of the detection target is a vehicle, the specific part is at least one of a local spot and an entire body of the vehicle.

7. The apparatus according to claim 1, wherein in a case where the stored settings are called by the user through the specific operation, the object detection unit executes the object detection processing based on the type of the detection target set by the first setting unit.

8. The apparatus according to claim 1, wherein the first setting unit is further configured to set none as the type of the detection target.

9. The apparatus according to claim 1,
wherein the storage unit stores a plurality of combinations of the first item and the second item, and
wherein the plurality of combinations is allocated to a plurality of operation members, respectively.

10. The apparatus according to claim 1, further comprising a third setting unit configured to set a third item relating to exposure.

11. The apparatus according to claim 1, wherein the specific operation is performed at a desired timing even after issuance of an instruction or during continuous shooting.

12. The apparatus according to claim 1, wherein during the specific operation, a setting value to be changed is displayed on a screen for a certain period of time to provide a notification about the setting value to be changed to the user.

13. The apparatus according to claim 1, wherein the object detection processing is performed within the AF area set by the second setting unit.

14. The apparatus according to claim 1, wherein the second setting unit is further configured to detect at least any one of a dog, a cat, a bird, a vehicle, a motorcycle, a railway, and an aircraft as the type of the detection target.

15. The apparatus according to claim 1, further comprising an image capturing unit.

16. An apparatus comprising:
one or more processors that execute a program stored in a memory and thereby function as:
a first setting unit configured to set a first item relating to a type of a detection target;
a second setting unit configured to set a second item relating to an autofocus (AF) area;
an object detection unit configured to execute object detection processing on an object of the type set by the first setting unit;
a focus detection unit configured to execute focus detection processing based on information about the AF area set by the second setting unit; and
a storage unit configured to store the settings as a combination of the set first item and the set second item, wherein the stored settings are called by a user through a specific operation, and the object detection processing and the focus detection processing are executed based on the called settings, wherein the second item is relating to a position of the AF area.

17. A method for an apparatus, comprising:

setting, as a first setting, a first item relating to a type of a detection target;

setting, as a second setting, a second item relating to an AF area;

executing object detection processing on an object of the type set in the first setting;

executing focus detection processing based on information about the AF area set in the second setting; and storing the settings as a combination of the set first item and the set second item, wherein the stored settings are called by a user through a specific operation, and the object detection processing and the focus detection processing are executed based on the called settings, wherein the second item is relating to a size of the AF area.

18. The method according to claim 17, wherein the first setting is further configured to set none as the type of the detection target.

19. A non-transitory computer-readable medium storing a program that causes, when executed by a computer of a focus detection device, the computer to function as:

a first setting unit configured to set a first item relating to a type of a detection target;

a second setting unit configured to set a second item relating to an AF area;

an object detection unit configured to execute object detection processing on an object of the type set by the first setting unit;

a focus detection unit configured to execute focus detection processing based on information about the AF area set by the second setting unit; and a storage unit configured to store the settings as a combination of the set first item and the set second item, wherein the stored settings are called by a user through a specific operation, and the object detection processing and the focus detection processing are executed based on the called settings, wherein the second item is relating to a size of the AF area.

20. The non-transitory computer-readable medium according to claim 19, wherein the first setting unit is further configured to set none as the type of the detection target.

* * * * *